A. AICHELE.
MOTOR CAR ENGINE STARTING APPARATUS.
APPLICATION FILED MAY 15, 1917.

1,284,850.

Patented Nov. 12, 1918.

A. Aichele, Inventor

Attorney

UNITED STATES PATENT OFFICE.

ALBERT AICHELE, OF BADEN, SWITZERLAND, ASSIGNOR TO A. G. BROWN BOVERI & CIE., OF BADEN, SWITZERLAND.

MOTOR-CAR-ENGINE-STARTING APPARATUS.

1,284,850.          Specification of Letters Patent.     Patented Nov. 12, 1918.

Application filed May 15, 1917. Serial No. 168,735.

*To all whom it may concern:*

Be it known that I, ALBERT AICHELE, a citizen of the Swiss Republic, residing at No. 10 Wiesenstrasse, Baden, Switzerland, have invented certain new and useful Improvements in Motor-Car-Engine-Starting Apparatus, of which the following is a specification.

This invention has for its object to provide an improved combined optional hand or power gear for starting motor car engines of the internal combustion type.

The cranking-up shaft of a motor car engine is usually coupled to the engine shaft by means of an axial sliding movement of the said cranking-up shaft, and the coupling between the two shafts is constructed as a catch-up clutch, wherein, in the case of a toothed clutch, the clutch teeth are made triangular so that the clutch will come automatically out of engagement as soon as the engine has started, that is to say, as soon as the speed of revolution of the engine has become greater than the speed of the cranking-up shaft.

If now in addition to the hand crank for starting the engine, there is provided a power starting gear operable from the driver's seat, namely an electric motor which starts the engine by turning the latter through toothed gearing, it is not advisable to employ the same clutch for coupling up the hand crank and the electric starting gear, because in starting by hand the operator would have to turn both the gearing and the electric motor armature as well.

Now according to this invention the starting shaft which is coupled to the engine in the case of an electric power starting gear, is constructed in the form of a hollow shaft that is coupled in a disconnectible manner to the hand-starting crank shaft which it incloses.

In starting by hand, the coupling between the hollow shaft and the solid hand cranking shaft is opened. The opening of this coupling may be effected by means of the same axial sliding movement of the hand cranking shaft which is employed to close the aforesaid coupling between the hand cranking shaft and the engine shaft, so that in such a case the sliding half of the clutch is common to both clutches.

When it is desired to start the engine by means of the electric power starting gear, the clutch between the hollow power shaft and the solid hand shaft is left closed, so that the latter shaft shares the axial sliding movement of the former shaft.

Embodiments of this invention are illustrated by way of example in the accompanying drawings in which:—

Figure 1:
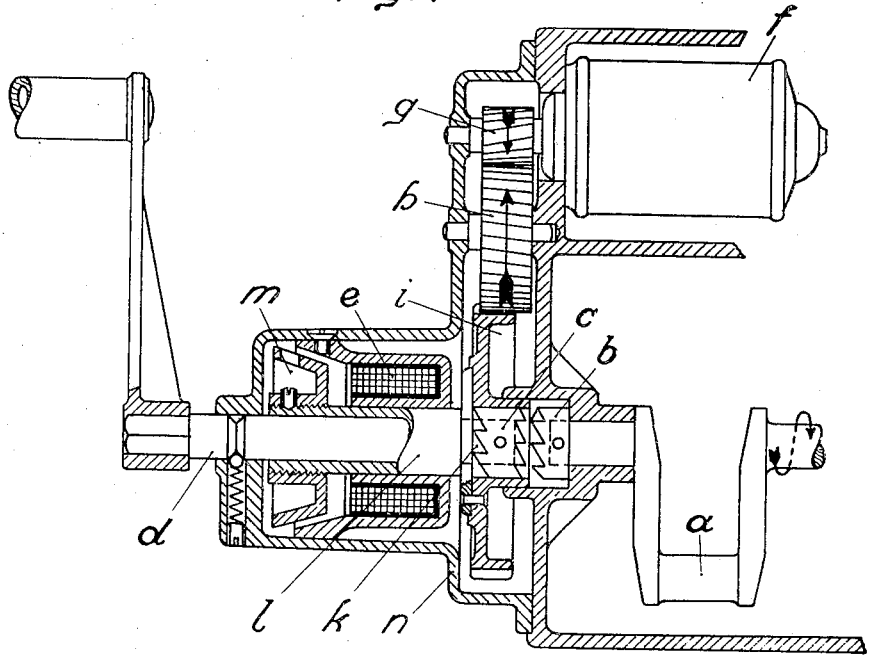
Figure 1 is an axial section of one form of the improved combined hand and power starting gear.

Referring first to Fig. 1, $a$ is the crank shaft of the car engine; its end carries the fixed member $b$ of the toothed clutch $b$, $c$. $d$ is the hand cranking shaft; on its end is fixed the sliding member $c$ of the said clutch $b$, $c$, which is toothed on one side for engaging with the fixed clutch member $b$, and is also toothed on its reverse side for engaging with the fixed member $k$ of the toothed clutch $c$ $k$ which is fixed on the end of the hollow power shaft $l$. On this shaft is fixed the toothed wheel $i$ which in the starting operation is driven through the toothed wheel gearing $g$, $h$ from the electric motor $f$. The shaft $l$ carries also the rotary armature $m$ of the electromagnet $e$ the stationary iron body of which, together with its winding, is fixed to the aluminium casing $n$.

In starting the car engine by means of the electric power gear, the magnet $e$ (on the closing of its energizing circuit) attracts its armature $m$ and closes the clutch $c$—$b$ without however opening the clutch $c$ $k$, so that the engine crank shaft $a$ is rotated by the electric motor $f$.

In cranking-up by hand, the shaft $d$ is first slid axially inside the hollow shaft $l$, whereby the clutch $c$—$k$ is opened and the clutch $b$—$c$ is closed and caused to rotate.

When the engine has started, the clutch $b$—$c$ is automatically open owing to the triangular shape of the clutch teeth.

By making the teeth of the toothed wheels $g$, $h$, $i$, of oblique form, the movements for opening and closing the clutch $b$—$c$ may be aided by the axial components of the pressure acting upon such oblique teeth.

The construction as shown in Fig. 1 has the drawback that the electric starting motor is situated in the vicinity of the car engine at a place where frequently there is not sufficient room available for the accommodation of such a large auxiliary apparatus, the actually available room being required for the ignition apparatus, the cooling water pump and other necessary appliances.

This drawback may be remedied by locating the electric starting motor at the place which, in the construction shown in Fig. 1, is occupied by the clutch-operating electromagnet, that is to say, outside the clutch casing and concentric to the hand starting shaft. In this modified construction, the armature of the electric starting motor drives a hollow shaft which in its turn drives the car engine shaft through a double purchase toothed gearing of any suitable speed-ratio.

The clutch-operating electromagnet is likewise arranged concentrically to the hand starting shaft, but in a different spot from that which it occupies in Fig. 1.

Figure 2:
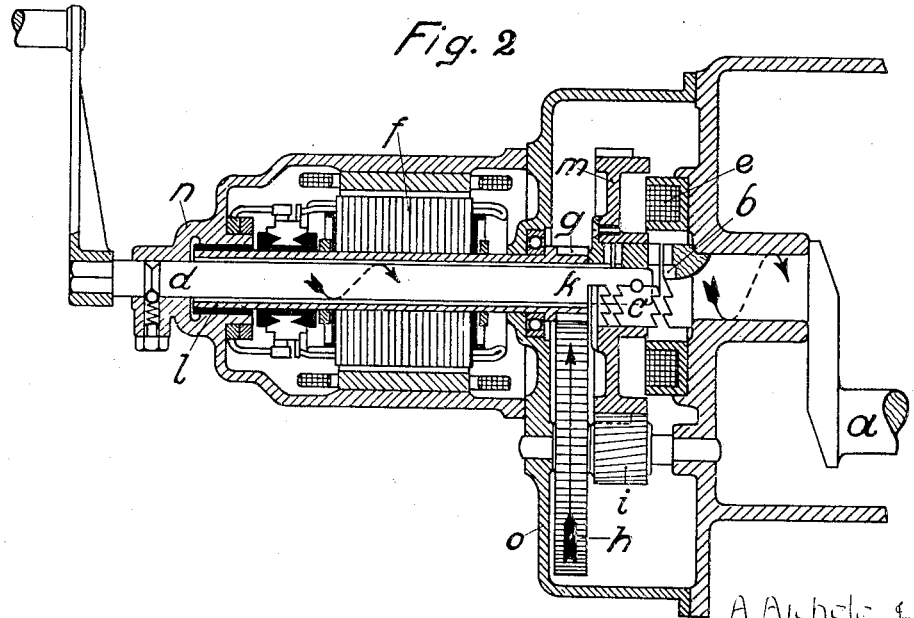
Fig. 2 is a similar view of a modification.

A practical example of this modified construction is illustrated in Fig. 2 wherein the same letters of reference are employed to indicate the corresponding parts shown in Fig. 1.

As shown in Fig. 2, the car engine crank-shaft $a$ carries on its front end the fixed member $b$ of the toothed clutch $b$—$c$, the sliding member $c$ of which is mounted on the rear end of the hand crank shaft $d$. This sliding clutch member $c$ is toothed on both sides and is also adapted to slide into engagement with the fixed member $k$ of the toothed clutch $c$ $k$ to which the toothed wheel $m$ is fixed. This wheel $m$ is adapted to be slid axially (together with the clutch member $k$) by the action of the electromagnet $e$ which is fixed to the engine casing, the body of the wheel $m$ being constructed to form the armature of the electromagnet. The wheel $m$ is driven through the toothed wheel gearing $i$, $h$, $g$, from the starting electric motor $f$. According to this invention the armature of this motor $f$ is fixed on the hollow shaft $l$ which incloses the hand crank shaft $d$ and which also carries the driving toothed wheel $g$. The casing $n$ of the electric motor $f$ is attached by means of a flange to the casing $o$ of the clutch and toothed gearing.

What I claim is:—

1. In a combined optional hand or power starting apparatus for a motor car engine of the combustion type, the combination of a hollow power starting shaft, a slidable hand starting shaft extending longitudinally through said power starting shaft, a clutch member rotatable by said hollow shaft, a clutch member on the car engine shaft, and a double-faced sliding clutch member fixed on said hand shaft and adapted for engagement with the other clutch members, whereby in starting by hand, said hand shaft is slid by the operator so as to slide said sliding clutch member into engagement with the clutch member on the car engine shaft, and out of engagement with the first mentioned clutch member, whereas in power-starting, said sliding clutch member is in engagement with both of the other clutch members.

2. In a combined optional hand or power starting apparatus for a motor car engine of the combustion type, the combination of a hollow power starting shaft, a slidable hand starting shaft extending longtiudinally through said power starting shaft, a clutch member rotatable by said hollow shaft, a clutch member on the car engine shaft, and a double-faced sliding clutch member fixed on said hand shaft and adapted for engagement with the other clutch members, whereby in starting by hand, said hand shaft is slid by the operator so as to slide said sliding clutch member into engagement with the clutch member on the car engine shaft, and out of engagement with the first mentioned clutch member, whereas in power-starting, said sliding clutch member is in engagement with both of the other clutch members, said clutch members forming two clutches of the "catch-up" type having the same direction of rotation.

3. In a combined optional hand or power starting apparatus for a motor car engine of the combustion type, the combination of a hollow power starting shaft, a slidable hand starting shaft extending longitudinally through said power starting shaft, a clutch member rotatable by said hollow shaft, a clutch member on the car engine shaft, and a double-faced sliding clutch member fixed on said hand shaft and adapted for engagement with the other clutch members, whereby in starting by hand, said hand shaft is slid by the operator so as to slide said sliding clutch member into engagement with the clutch member on the car engine shaft, and out of engagement with the first mentioned clutch member, whereas in power-starting, said sliding clutch member is in engagement with both of the other clutch members, and electromagnetic means for effecting engagement between the power and hand operated clutch members and between the latter member and the clutch member on the engine shaft.

4. In a combined optional hand or electric power starting apparatus for a motor car engine of the internal combustion type, the combination of a hollow power starting shaft capable of revolving but not of axial sliding movement, a slidable hand starting shaft extending longitudinally through said power shaft, an electromagnet fixed to the car engine crank casing, a fixed clutch member on the car engine shaft, a toothed wheel serving as an armature for said electromagnet, a fixed clutch member on said toothed wheel, a double-faced sliding clutch member adapted to engage both said fixed clutch members, fixed on said slidable hand starting shaft, a casing inclosing said clutch mechanism, attached to the front of the car engine crank casing, and a starting electric motor located in front of said clutch-inclosing casing, located concentrically to said hand starting shaft, and having its armature fixed on said power shaft.

In testimony whereof I have signed my name to this specification.

ALBERT AICHELE.